United States Patent
Shibamura

(10) Patent No.: US 6,647,072 B1
(45) Date of Patent: Nov. 11, 2003

(54) TRANSMITTING CIRCUIT IMPROVING SN RATIO IN LOW OUTPUT POWER AND CN RATIO IN LOW TO INTERMEDIATE OUTPUT POWER

(75) Inventor: Yousuke Shibamura, Kanagawa-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 09/426,618

(22) Filed: Oct. 26, 1999

(30) Foreign Application Priority Data

Oct. 29, 1998 (JP) .............................. 10-308931

(51) Int. Cl.⁷ .............................. H04L 25/03; H04B 1/04
(52) U.S. Cl. ........................................ 375/297; 455/127
(58) Field of Search ..................... 375/297, 295, 375/312; 455/127, 232.1, 234.1, 236.1, 240.1, 245.1, 251.1, 126

(56) References Cited

U.S. PATENT DOCUMENTS

| | | | | |
|---|---|---|---|---|
| 4,578,638 A | * | 3/1986 | Takano et al. | 324/76.23 |
| 5,307,512 A | | 4/1994 | Mitzlaff | 455/126 |
| 5,559,836 A | * | 9/1996 | Nishijima | 375/318 |
| 5,926,749 A | | 7/1999 | Igarashi et al. | 455/127 |

* cited by examiner

Primary Examiner—Khai Tran
(74) Attorney, Agent, or Firm—Brinks Hofer Gilson & Lione

(57) ABSTRACT

The present invention provides a transmitting circuit that improves the SN ratio in a higher output power and the CN ratio in an intermediate to lower output power, and makes linear the characteristic of the attenuation gain. In this transmitting circuit, the intermediate frequency amplifier, high frequency amplifier, and driver amplifier are configured using variable gain amplifiers. And, the gains of the intermediate frequency amplifier, high frequency amplifier, and driver amplifier are designed to be varied by the automatic gain control voltage.

3 Claims, 3 Drawing Sheets

TRANSMITTING CIRCUIT IMPROVING SN RATIO IN LOW OUTPUT POWER AND CN RATIO IN LOW TO INTERMEDIATE OUTPUT POWER

BACKGROUND OF THE INVENTION

1. Field of the Invention

The present invention relates to a transmitting circuit for use in a portable telephone of the CDMA system or the like.

2. Description of the Related Art

The portable telephone having a transmitting circuit and receiving circuit performs transmission and reception with a base station, whereby the subscribers communicate each other through the base station. Here, since the transmission signal level that the base station transmits to the portable telephones is always constant, the reception signal level that a portable telephone receives varies depending on the distance between the base station and the portable telephone. Further, the base station is designed to receive a signal outputted by a portable telephone always at a constant level.

Therefore, both the receiving circuit and the transmitting circuit of a portable telephone require wide dynamic ranges. Further, in the receiving circuit, the gains of the internal amplifiers are designed to be controlled by the automatic gain control voltage based on the power control signal from the base station, and based on the automatic gain control voltage, the transmission signal level transmitted to the base station from the transmitting circuit is designed to be varied.

The conventional transmitting circuit will be explained with reference to FIG. 4 through FIG. 6. First, in FIG. 4, a QPSK modulated intermediate frequency signal IF of the 200 MHz band is outputted from a modulator not illustrated, and inputted to an intermediate frequency amplifier 21. The intermediate frequency amplifier 21 is configured with a gain controllable variable gain amplifier, and the gain is controlled by an automatic gain control voltage V based on the power control signal from the base station. The automatic gain control voltage V varies from 3.0 volts to 0 volt, and as shown by the curve A in FIG. 5, the gain is controlled to be attenuated from the maximum gain to about −60 dB. The intermediate frequency signal IF is amplified by the intermediate frequency amplifier 21, and thereafter inputted to a frequency converter 22 configured with a mixer 22a and a local oscillator 22b. The intermediate frequency signal IF is mixed in the mixer 22a with a local oscillation signal outputted from the local oscillator 22b, whereby it is converted into a transmission signal RF of about 1.1 GHz band.

The transmission signal RF is first amplified by a high frequency amplifier (called as RF amplifier) 23. The RF amplifier 23 is also configured with a gain controllable variable gain amplifier, whose gain is controlled by the automatic gain control voltage V, and as shown by the curve B in FIG. 5, the gain is made to be attenuated from the maximum gain to about −30 dB. Accordingly, the total attenuation of gain by the intermediate frequency amplifier 21 and the RF amplifier 23 can be secured for 90 dB, as shown by the curve C in FIG. 5. The RF signal amplified by the RF amplifier 23 is further amplified by a driver amplifier 24. The driver amplifier 24 is to amplify the RF signal to such a level as to sufficiently drive a power amplifier 25 at the next stage. The RF signal amplified by the driver amplifier 24 is amplified to a specific transmission level by the power amplifier 25, which is transmitted toward the base station from an antenna 26.

The driver amplifier 24 is configured with a differential amplifier 7 including two transistors 7a, 7b. Both the emitters of the transistors 7a, 7b are grounded through a resistor 7c, and the collectors are supplied with a voltage B through load resistors 7d, 7e. Further, the transmission signal RF amplified by the RF amplifier 23 is inputted to both the bases, and the amplified transmission signal RF is outputted from both the collectors.

In the conventional transmitting circuit thus constructed, the gain of the intermediate frequency amplifier 21 that amplifies the intermediate frequency signal IF of a lower frequency is higher (about double) than the gain of the RF amplifier 23 that amplifies the transmission signal RF of a higher frequency; accordingly to secure the total attenuation of gain, the rate of attenuation gain shared between the intermediate frequency amplifier 21 and the RF amplifier 23 is about two to one at average within the variation range (3.0 volts to 0 volt) of the automatic gain control voltage V. In addition, since the RF amplifier 23 amplifies the higher frequency signal, the gain thereof is saturated as the automatic gain control voltage V becomes high. As a result, in the higher range of the automatic gain control voltage V (for example, from 3.0 volts to 1.5 volts), the rate of the attenuation gain shared with the intermediate frequency amplifier 21 in the total attenuation gain becomes higher (more than 2/3), which deteriorates the SN ratio. Also, in the lower range of the automatic gain control voltage V (for example, from 1.5 volts to 0 volt) that controls the output power into an intermediate power or a low power, the rate of the attenuation gain shared with the intermediate frequency amplifier 21 in the total attenuation gain becomes higher (virtually 2/3), which deteriorates the CN ratio.

On the other hand, the characteristic of the attenuation gain in the receiving circuit is designed to be linear against the automatic gain control voltage. However, as mentioned above, since the RF amplifier 23 is saturated in the higher range of the automatic gain control voltage V, the relation (attenuation gain characteristic) of the automatic gain control voltage V against the attenuation gain does not become linear. In consequence, the characteristic of the total attenuation gain (curve C in FIG. 5) does not become linear, and thereby the matching with the characteristic of the attenuation gain in the receiving circuit cannot be achieved, which is a problem to be solved.

SUMMARY OF THE INVENTION

Accordingly, it is an object of the present invention to provide a transmitting circuit that improves the SN ratio in the lower power output (in the higher range of the automatic gain control voltage V (for example, from 3.0 volts to 1.5 volts)) and the CN ration in the lower to intermediate power output (in the lower range of the automatic gain control voltage V (for example, from 1.5 volts to 0 volt)), and makes the attenuation gain characteristic linear.

In order to solve the foregoing problems, the transmitting circuit of the present invention contains an intermediate frequency amplifier that amplifies an intermediate frequency signal, a frequency converter that applies frequency conversion to the intermediate frequency signal into a transmission signal of a higher frequency than the intermediate frequency, a high frequency amplifier that amplifies the transmission signal, and a driver amplifier that further amplifies the transmission signal amplified by the high frequency amplifier and inputs it the result to a power amplifier. And in this construction, the intermediate frequency amplifier, the high frequency amplifier, and the driver amplifier are configured using variable gain amplifiers, and the gain of the intermediate frequency amplifier, the gain of the high frequency amplifier, and the gain of the driver amplifier are made to be varied by an automatic gain control voltage.

Further, in the transmitting circuit of the present invention, the automatic control voltage varies from a first voltage to a second voltage, the gain of the intermediate frequency amplifier and the gain of the high frequency amplifier vary between the first voltage and the second voltage, each of the gains becomes maximum at the first voltage and each becomes minimum at the second voltage, the gain of the driver amplifier is made to be attenuated gradually from the maximum gain to a specific gain, as the automatic gain control voltage varies from the first voltage to a third voltage intervening between the first voltage and the second voltage, and the specific gain is made to be maintained between the third voltage and the second voltage.

Further, in the transmitting circuit of the present invention, the driver amplifier is configured with an amplifier having amplifying elements and a constant current circuit that flows a current through the amplifying elements, the gain of the amplifier is proportional to the current, the current of the constant current circuit is made to be decreased gradually from a maximum current to a specific current, as the automatic gain control voltage varies from the first voltage to the third voltage, and the specific current is made to be maintained between the third voltage and the second voltage.

Furthermore, in the transmitting circuit of the present invention, the constant current circuit is configured with a current mirror circuit including two transistors and a junction FET that controls a current of the transistors, a current running through one of the transistors is made to flow through the amplifying elements, the collector of the other of the transistors is supplied with a fixed voltage through a resistor, through which the collector is also connected to the source of the junction FET, and the gate of the junction FET is supplied with the automatic gain control voltage.

DETAILED DESCRIPTION OF THE PREFERRED EMBODIMENT

Figure 1:
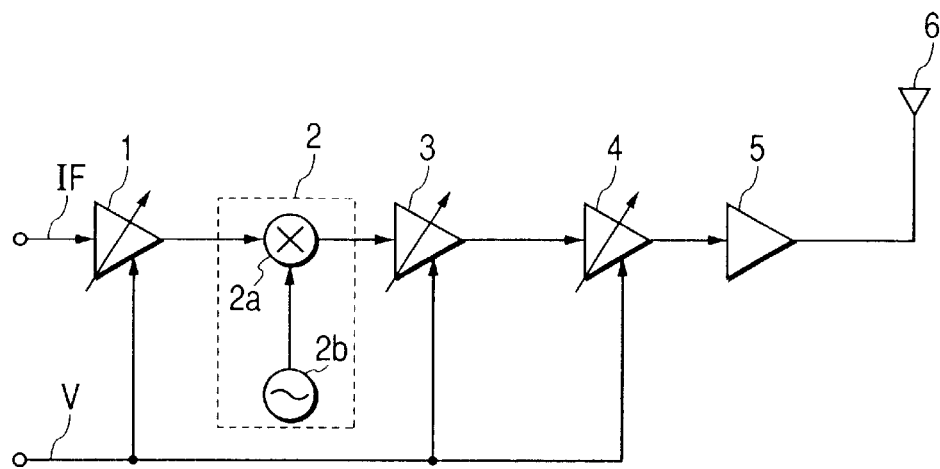
FIG. 1 is a block diagram of a transmitting circuit of the present invention.
Figure 2:
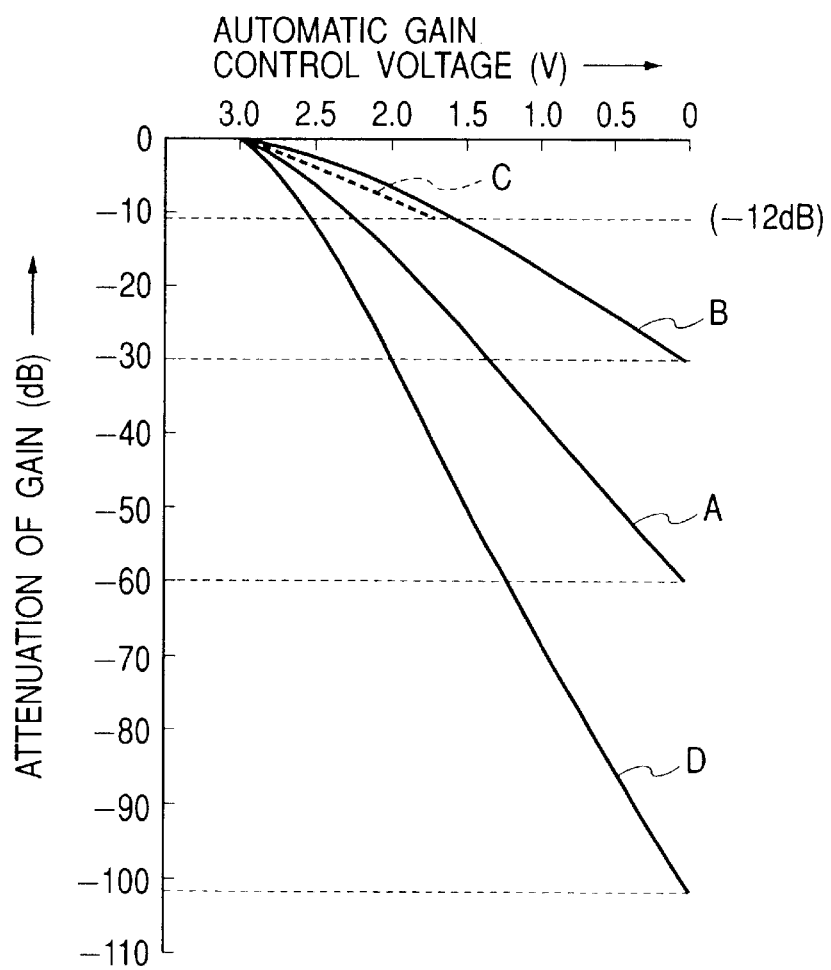
FIG. 2 is a gain control characteristic of an intermediate amplifier, an RF amplifier, and a driver amplifier of the block diagram shown in FIG. 1.
Figure 3:
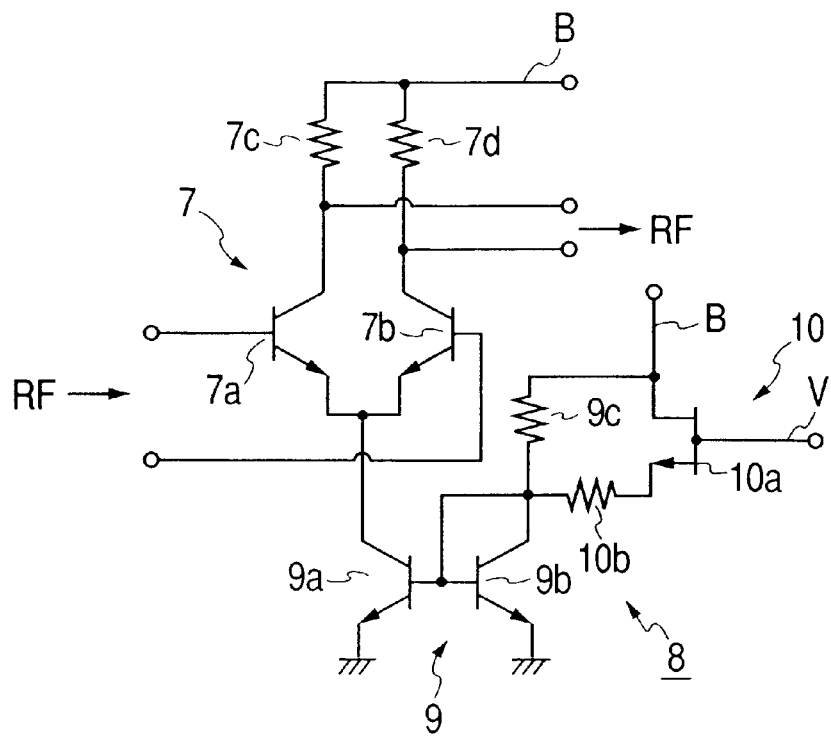
FIG. 3 is a circuit diagram of the drive amplifier in FIG. 1.
Figure 4:
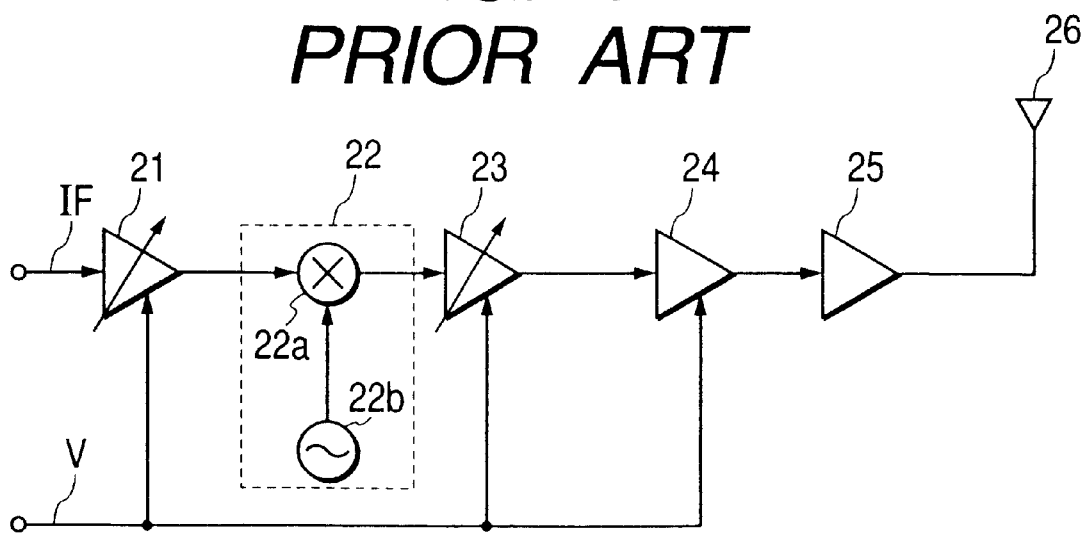
FIG. 4 is a block diagram of a conventional transmitting circuit.
Figure 5:
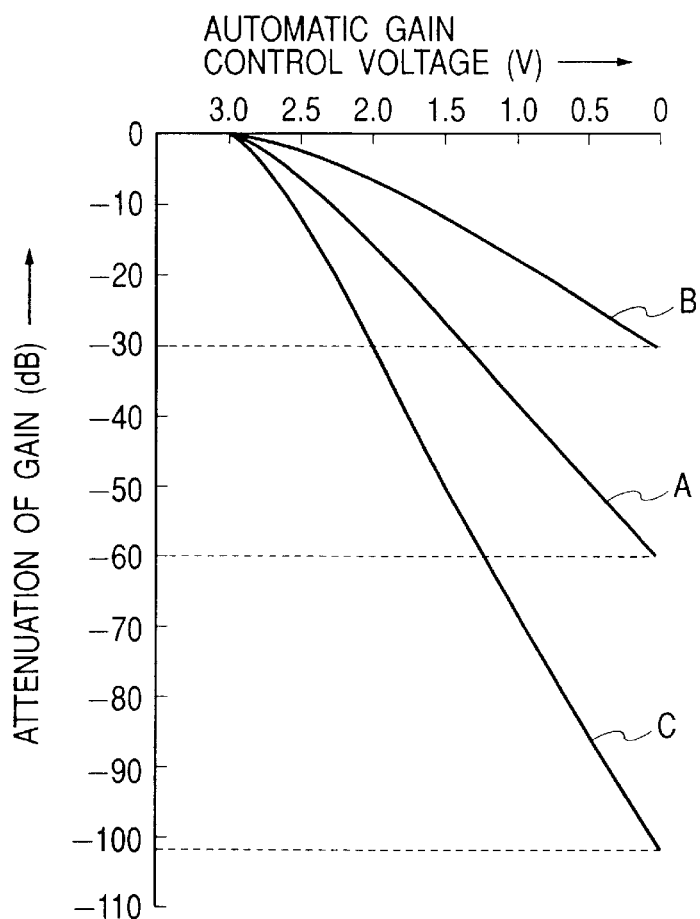
FIG. 5 is a gain control characteristic of an intermediate amplifier, an RF amplifier, and a driver amplifier of the block diagram shown in FIG. 4.
Figure 6:
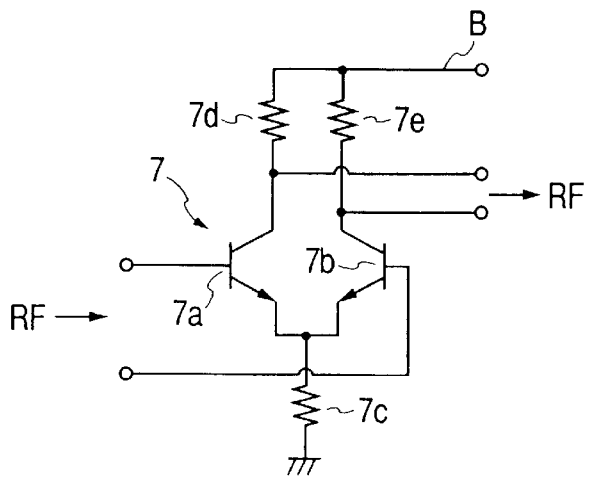
FIG. 6 is a circuit diagram of the drive amplifier in FIG. 4.

A transmitting circuit of the present invention will be discussed with reference to FIG. 1 through FIG. 3. FIG. 1 is a block diagram of the transmitting circuit of the present invention, FIG. 2 is the characteristic of attenuation gains of an intermediate amplifier, an RF amplifier, and a driver amplifier of the block diagram shown in FIG. 1, and FIG. 3 is a circuit diagram of the drive amplifier in FIG. 1.

First, in FIG. 1, a QPSK modulated intermediate frequency signal IF of the 200 MHz band is outputted from a modulator not illustrated, and inputted to an intermediate frequency amplifier 1. The intermediate frequency amplifier 1 is configured with a gain controllable variable gain amplifier, and the gain is controlled by an automatic gain control voltage V based on the power control signal from the base station. The automatic gain control voltage V varies from 3.0 volts being a first voltage to 0 volt being a second voltage, and the gain of the intermediate amplifier becomes maximum when the automatic gain control voltage V is 3.0 volts, and becomes minimum when it is 0 volt. Therefore, as shown by the curve A in FIG. 2, the gain is controlled to be attenuated to about −60 dB, as the automatic gain control voltage V varies from 3.0 volts to 0 volt. This automatic gain control voltage V varies from 0 volt to 3.0 volts, as the reception signal varies from a high level to a low. The intermediate frequency signal IF is amplified by the intermediate frequency amplifier 1, and thereafter inputted to a frequency converter 2 configured with a mixer 2a and a local oscillator 2b. The intermediate frequency signal IF is mixed, in the mixer 2a, with a local oscillation signal outputted from the local oscillator 2b, whereby it is converted into a transmission signal RF of about 1.1 GHz band.

The transmission signal RF is first amplified by a high frequency amplifier (RF amplifier) 3. The RF amplifier 3 is also configured with a gain controllable variable gain amplifier, whose gain becomes maximum when the automatic gain control voltage V is 3.0 volts, and becomes minimum when it is 0 volt. And, as shown by the curve B in FIG. 2, the gain is controlled to be attenuated to about −30 dB by the automatic gain control voltage V. However, as shown by the curve B in FIG. 2, the gain of the RF amplifier 3 is inclined to be saturated as the automatic gain control voltage V exceeds 1.5 volts. The transmission signal RF amplified by the RF amplifier 3 is further amplified by a driver amplifier 4. The driver amplifier 4 is to amplify the transmission signal RF to such a level as to sufficiently drive a power amplifier 5 at the next stage.

Also, the driver amplifier 4 is configured with a gain controllable variable gain amplifier, and the gain thereof is controlled by the automatic gain control voltage V. However, the range of the automatic gain control voltage V that controls the gain is confined to a range from 3.0 volts to 1.5 volts being a third voltage intervening between 3.0 volts and 0 volt. And, as shown by the curve C in FIG. 2, until the automatic gain control voltage V decreases to 1.5 volts, the gain attenuates to about −12 dB where it becomes a specific gain; although the automatic gain control voltage V becomes lower than that, the gain is maintained constant at the attenuation of gain by 12 dB. Therefore, the total attenuation of gain by the intermediate frequency amplifier 1 and the RF amplifier 3 and the driver amplifier 4 has a variation range of about 102 dB, as shown by the curve D in FIG. 2. As the result, the rate of the attenuation gain by the intermediate frequency amplifier 1 in the total attenuation gain is reduced, whereby the SN ratio is bettered.

The transmission signal RF amplified by the driver amplifier 4 is amplified to a specific transmission level by the power amplifier 5, which is transmitted toward the base station from an antenna 6.

In FIG. 3, the drive amplifier 4 is configured with a differential amplifier 7 and a constant current circuit 8. The differential amplifier 7 includes two transistors 7a, 7b, whose emitters are connected to each other, whose collectors are supplied with a voltage B through load resistors 7c, 7d. Further, the emitters of the transistors 7a, 7b are connected to the constant current circuit 8. The transmission signal RF is inputted to both the bases of the transistors 7a, 7b; and the amplified transmission signal RF is outputted from both the collectors thereof. Further, the gain of the differential amplifier 7 is proportional to the collector current running through the transistors 7a, 7b.

The constant current circuit 8 is configured with a current mirror circuit 9 and a current control circuit 10. The collector of one transistor 9a that constitutes the current mirror circuit 9 is connected to the emitters of the transistors 7a, 7b of the differential amplifier 7. Further, the collector and the base of the other transistor 9b that constitutes the current mirror circuit 9 are connected to each other, and the collector thereof is supplied with the voltage B through a resistor 9c. On the other hand, the drain of a junction FET 10a that constitutes the current control circuit 10 is supplied with the voltage B, and the source thereof is connected to the collector of the transistor 9b through a resistor 10b. Further, the gate thereof is supplied with the automatic gain control voltage V. Further, the emitters of the transistors 9a, 9b are grounded.

In the foregoing configuration, the collector current of the transistor 9b being the other transistor that constitutes the current mirror circuit 9 is the addition of a current running through the resistor 9c and a current running through the junction FET 10a. Although the current running through the resistor 9c is substantially constant, the current running through the junction FET 10a varies depending on the automatic gain control voltage V. Therefore, the collector current of the transistor 9b becomes maximum when the automatic gain control voltage V is 3.0 volts.

Since the collector current of the transistor 9a of the current mirror circuit 9 is identical to the collector current of the transistor 9b, a half of the collector current flows at maximum through each of the emitters of the transistors 7a, 7b constituting the differential amplifier 7.

When the automatic gain control voltage V is 3.0 volts, the maximum current flows through the transistors 7a, 7b of the differential amplifier 7 to raise the gain of the differential amplifier 7; and as shown by the curve C in FIG. 2, as the automatic gain control voltage V becomes lower, the current flowing through the transistors 7a, 7b of the differential amplifier 7 decreases to lower the gain. And, as the automatic gain control voltage V becomes 1.5 volts being the third voltage, the junction FET 10a is made to be cut off, where the junction FET 10a stops running a current, and only the specific current flows into the transistor 9b of the current mirror circuit 9 through the resistor 9c. Here, the gain of the differential amplifier is attenuated by 12 dB to become constant (see Curve C in FIG. 2). Further, the gain of the differential amplifier 7 is still more increased when the gate voltage of the junction FET 10a becomes more than 3.0 volts.

Consequently, the gain of the intermediate frequency amplifier 1 and the gain of the RF amplifier 3 decrease gradually, as the automatic gain control voltage V lowers from 3.0 volts toward 0 volt. On the other hand, the gain of the driver amplifier 4 decreases gradually, as the automatic gain control voltage V lowers from 3.0 volts toward 1.5 volts, and the gain is locked to virtually constant attenuation (12 dB), as it becomes lower than 1.5 volts. As the result, within the range of the automatic gain control voltage V being more than 1.5 volts, the characteristic of attenuation gain of the driver 4 is added to the foregoing two. Therefore, the saturation characteristic of the RF amplifier 3 is corrected, and the characteristic of the total attenuation gain is made linear, as shown by the curve D in FIG. 2.

As the embodiment being thus described, the transmitting circuit of the present invention is configured with the intermediate frequency amplifier, high frequency amplifier, driver amplifier, and variable gain amplifier, and the automatic gain control voltage is designed to vary the gains of the intermediate frequency amplifier, the high frequency amplifier, and the driver amplifier; and thereby, the rate of the attenuation gain shared with the intermediate frequency amplifier in the total attenuation gain is decreased to better the SN ratio and the CN ratio.

Further, in the transmitting circuit of the present invention, as the automatic gain control voltage varies from the first voltage to the third voltage intervening between the first voltage and the second voltage, the gain of the driver amplifier is made to be attenuated gradually from the maximum gain to the specific gain, and the specific gain is made to be maintained between the third voltage and the second voltage; thereby, the characteristic of the total attenuation gain against the automatic gain control voltage is made linear.

Further, in the transmitting circuit of the present invention, as the automatic gain control voltage varies from the first voltage to the third voltage, the current of the constant current circuit for supplying a constant current to the amplifying elements of the driver amplifier is made to be attenuated gradually from a maximum current to a specific current, and the specific current is made to be maintained between the third voltage and the second voltage; and thereby the gain of the driver amplifier can be maintained at the specific gain therebetween.

Further, in the transmitting circuit of the present invention, the constant current circuit is configured with a current mirror circuit including two transistors and a junction FET for controlling the current of the transistors, in which the current running through one of the transistors is made to flow through the amplifying elements, the collector of the other transistor is supplied with a fixed voltage through a resistor, also through the resistor the collector is connected to the source of the junction FET, and the gate of the junction FET is supplied with the automatic gain control voltage; thereby, the current running through the amplifying elements of the driver amplifier can be controlled by the automatic gain control voltage.

What is claimed is:

1. A transmitting circuit comprising an intermediate frequency amplifier that amplifies an intermediate frequency signal, a frequency converter that applies frequency conversion to said intermediate frequency signal into a transmission signal of a higher frequency than said intermediate frequency, a high frequency amplifier that amplifies said transmission signal, and a driver amplifier that further amplifies the transmission signal amplified by said high frequency amplifier and inputs it to a power amplifier, wherein said intermediate frequency amplifier, said high frequency amplifier, and said driver amplifier are configured using variable gain amplifiers, and a gain of said intermediate frequency amplifier, a gain of said high frequency amplifier, and a gain of said driver amplifier are made to be varied by an automatic gain control voltage, wherein said automatic control voltage varies from a first voltage to a second voltage, the gain of said intermediate frequency amplifier and the gain of said high frequency amplifier vary between said first voltage and said second voltage, each of the gains becomes maximum at said first voltage and each becomes minimum at said second voltage, the gain of said driver amplifier is made to be attenuated gradually from the maximum gain to a specific gain, as said automatic gain control voltage varies from said first voltage to a third voltage intervening between said first voltage and said second voltage, and said specific gain is made to be maintained between said third voltage and said second voltage.

2. The transmitting circuit according to claim 1, wherein said driver amplifier is configured with an amplifier having amplifying elements and a constant current circuit that flows a current through said amplifying elements, a gain of said amplifier is proportional to the current, a current of said constant current circuit is made to be decreased gradually from a maximum current to a specific current, as said automatic gain control voltage varies from said first voltage to said third voltage, and said specific current is made to be maintained between said third voltage and said second voltage.

3. The transmitting circuit according to claim 2, wherein said constant current circuit is configured with a current mirror circuit including two transistors and a junction FET that controls a current of said transistors, a current running through one of said transistors is made to flow through said amplifying elements, a collector of the other of said transistors is supplied with a fixed voltage through a resistor, through which said collector is also connected to a source of said junction FET, and a gate of said junction FET is supplied with said automatic gain control voltage.

* * * * *